United States Patent
Ahmed et al.

(10) Patent No.: US 8,886,659 B2
(45) Date of Patent: Nov. 11, 2014

(54) DATA FRAMEWORK TO ENABLE RICH PROCESSING OF DATA FROM ANY ARBITRARY DATA SOURCE

(75) Inventors: Haroon Ahmed, Bellevue, WA (US); John David Doty, Seattle, WA (US); Donald F. Box, Bellevue, WA (US); Randy S. Kimmerly, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 83 days.

(21) Appl. No.: 13/599,792

(22) Filed: Aug. 30, 2012

(65) Prior Publication Data

US 2012/0323946 A1    Dec. 20, 2012

Related U.S. Application Data

(63) Continuation of application No. 12/604,749, filed on Oct. 23, 2009, now Pat. No. 8,290,922.

(51) Int. Cl.
*G06F 17/30* (2006.01)

(52) U.S. Cl.
CPC .... *G06F 17/30477* (2013.01); *G06F 17/30471* (2013.01)
USPC .......................................................... 707/756

(58) Field of Classification Search
USPC .......................................................... 707/759
See application file for complete search history.

(56) References Cited

U.S. PATENT DOCUMENTS

| | | | |
|---|---|---|---|
| 5,754,771 A | 5/1998 | Epperson | |
| 6,125,371 A | 9/2000 | Bohannon | |
| 6,282,537 B1 | 8/2001 | Madnick | |
| 7,233,940 B2 | 6/2007 | Bamberger | |
| 7,421,458 B1 | 9/2008 | Taylor et al. | |
| 7,698,348 B2 * | 4/2010 | Walker et al. | 707/790 |
| 2004/0088318 A1 | 5/2004 | Brady | |
| 2007/0050603 A1 | 3/2007 | Vorbach | |
| 2009/0055409 A1 * | 2/2009 | Tasser et al. | 707/100 |

OTHER PUBLICATIONS

Asynchronous Programming Overview—Published Date: 2009 http://msdn.microsoft.com/en-us/library/2e08f6yc(VS.71).aspx (Copy Attached) [Retrieved Oct. 16, 2009].
A Metadata-Driven Framework for Generating Field Dat Entry Interfaces in Ecology—Published Date: Jun. 2007 http://ucsb.piscoweb.org/~blanchet/pdfs/jones_etal2007.pdf (Copy Attached).
Tracking Search Queries—Retrieved Date: Oct. 16, 2009 http://www.mnogosearch.org/doc33/msearch-track.html (Copy Attached).
U.S. Appl. No. 12/604,749, Mail Date Jun. 18, 2012, Notice of Allowance.
U.S. Appl. No. 12/604,749, Mail Date Oct. 26, 2011, Office Action.

* cited by examiner

*Primary Examiner* — Etienne Leroux
*Assistant Examiner* — Cindy Nguyen
(74) *Attorney, Agent, or Firm* — Nicholas Chen; David Andrews; Micky Minhas

(57) ABSTRACT

Data is accessed and updated in a data store at a field granularity. A user query specifies one or more non-unique fields of a record. The query is sent to a data store to retrieve the fields of the record at a field granularity, in satisfaction of the query. The fields of the record can also be modified by transmitting a record ID along with original content, while omitting some of the record data, and by also including the modification to be made.

16 Claims, 9 Drawing Sheets

DATA FRAMEWORK TO ENABLE RICH PROCESSING OF DATA FROM ANY ARBITRARY DATA SOURCE

CROSS-REFERENCE TO RELATED APPLICATIONS

This application is a continuation of U.S. patent application Ser. No. 12/604,749, filed on Oct. 23, 2009, entitled "DATA FRAMEWORK TO ENABLE RICH PROCESSING OF DATA FROM ANY ARBITRARY DATA SOURCE," now issued as U.S. Pat. No. 8,290,922, on Oct. 16, 2012, and which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Databases are a class of data stores used by computing systems. Databases generally allow data to be organized in various tables, which may be inter-related, such as is common in the area of relational databases. In particular, a database typically includes tables, where the tables are further subdivided into rows and columns. A row in a database generally represents a record for a particular data item. For example, a row in a database may be a record for a particular e-commerce customer. Columns in a database represent categories of cells, which are fields for this particular example. For example, a column may include first names for customer, a different column may include last names for different customers; a different column may include street addresses for different customers; and so forth.

The intersection of a row and column is a field, and includes specific data for a specific record. For example, the intersection of a particular row for a particular customer of an e-commerce site with the column for first names may include the string "Bob." To access the data in a database, a framework may be used where the framework provides tools for accessing, changing, or otherwise interacting with the database. For example, many data processing frameworks provide data services like query, updates, identity management, state management, optimistic concurrency, user interface binding etc. These services are typically provided at an abstract level of "records" or equivalent units.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiments described herein is directed to a method that may be practiced in a computing environment, the method includes acts for accessing data in a data store. The method includes receiving a query from a user. The query specifyies one or more non-unique fields of a record. The method further includes sending the query to a data store to retrieve the fields of the record at a field granularity. The method further includes receiving data for the one or more non-unique fields of the record at a field granularity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

A framework is described herein which allow data access services to be provided at a higher granularity level of 'fields' as opposed to at a record or row granularity. In addition, the framework introduces new and innovative data services like conflict resolution, new data states, and query-centric refresh etc. Various features of the framework will be described. It should be noted that several of the features can be used independently of one another, and that such features are infact in and of themselves novel and unique. Additionally, some such features can be implemented without implementing other features. However, it should also be noted that some features described herein, while able to be implemented independently, may be nonetheless implemented with other features to further enhance functionality of some embodiments.

Briefly summarizing, some features of some embodiments described herein include: use of 'field' as the fundamental unit of data management operations and services; preservation of multiple versions of data in a 'field'; tracking of all executed queries inside a system; presentation and treatment of metadata as data allowing the metadata to be queried and modified in a fashion similar to that for underlying data; embodiments where no initial environment setup is required, but rather a system faults-in metadata as needed; ability to take data and metadata offline, manipulate the data and metadata offline, and merge data and metadata back smartly to a live data source, such as a database; and embodiments that support asynchronous programming and execution model to support multi-processor and multi-thread environments.

Examples are illustrated herein using relational database systems, which use tables, rows, columns, and cells. However, the features described herein can be used with virtually any data store implementing records (e.g. rows) categories (e.g. columns) cells (e.g. fields), etc.

Various embodiments illustrated herein are illustrated as methods. Methods and method acts may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Use of 'Field' as a Fundamental Unit of Data Management Operations and Services

Figure 1A:
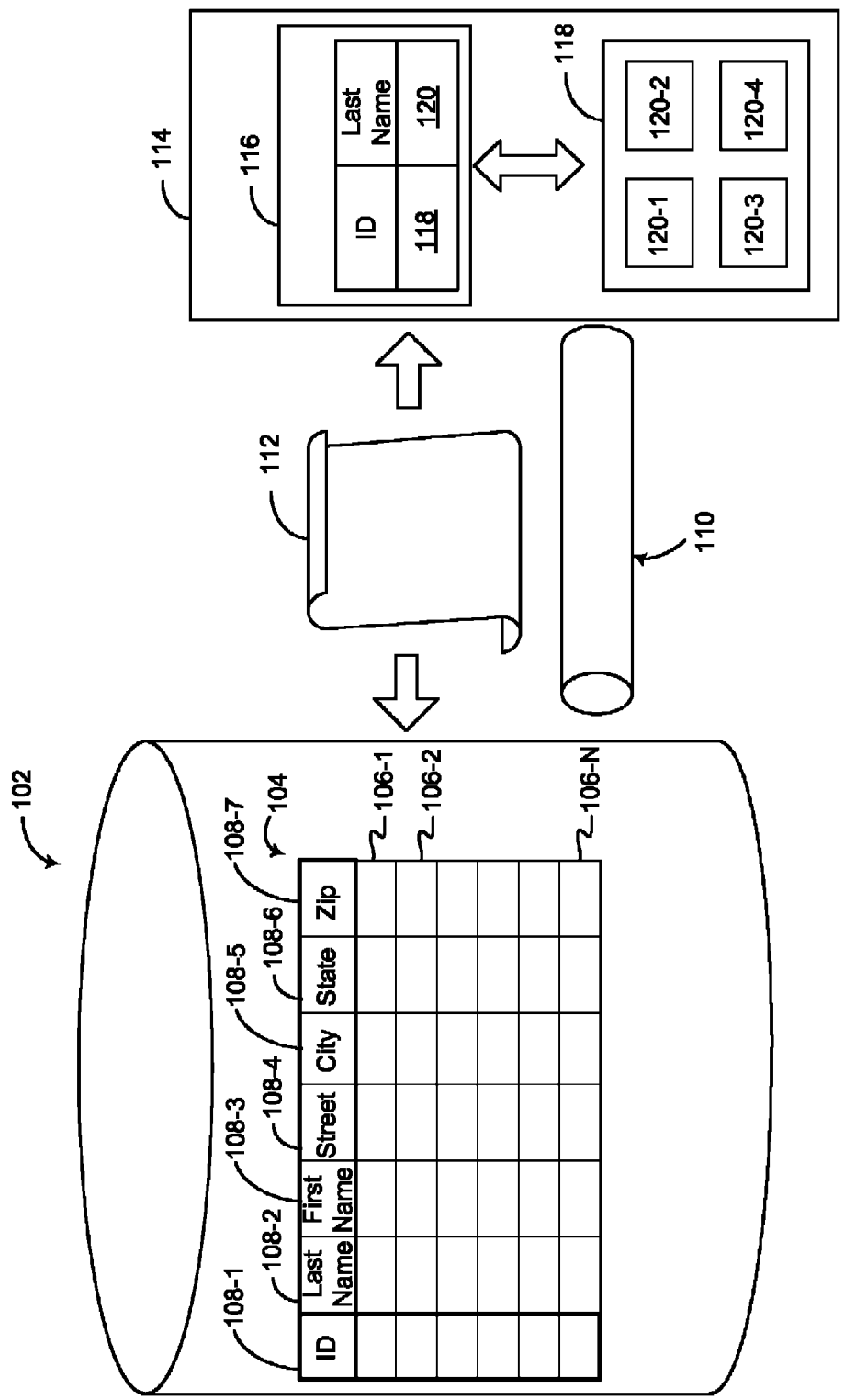
FIG. 1A illustrates a database and client running a specialized framework illustrating field granularity.

Referring now to FIG. 1A, an example embodiment is illustrated. FIG. 1A illustrates a relational database 102. In this particular example, the relational database 102 includes a table 104. The table 104 includes a number of rows referred to herein generally as 106 and specifically and 106-*n*, where n is a number designating a specific row. In this example, a row in the database is an example of a record in a data store. The table 104 further includes a number of columns, referred to herein generally as 108, and specifically and 108-1, 108-2, 108-3, 108-4, 108-5, 108-6, and 108-7. In this example, each of the cells in the ID column 108-1 include a unique record identity, which in some embodiments, may be for example a globally unique record identity (e.g. a GUID). In particular, a cell in the ID column is a unique identifier for a record in a data store. Each of the cells in the "last name" column 108-2 include the last name for a record, such as for example, the last name of an e-commerce customer. Each of the cells in the "first name" column 108-3 include the first name for a record. Each of the cells in the "street" column 108-4 include the street address for a record. Each of the cells in the "city" column 108-5 include the city name of an address for a record. Each of the cells in the "state" column 108-6 include the state name of an address for a record. Each of the cells in the "zip" column 108-7 include the zip code of an address for a record.

FIG. 1A illustrates an example whereby data processing is performed at a field granularity. As noted previously, typical data processing frameworks offer a wide variety of services including retrieval, modification, persistence, state management, identity management, refresh/resync, concurrency control, connection/transaction management, UI binding, serialization and deseriazliation of data. All these operations are traditionally built using 'record' (or specifically a row in a relational database management system) as the basic unit of operation with no finer grained support.

However, some embodiments implement a system that provides all these services but uses 'field' (or more specifically "cell" in the relational database management system example), as the fundamental unit of operation. This is an innovation in the space that may have deep impacts on the future of data management tools and applications. For example, by retrieving only the desired fields instead of all fields of a given record, the system eases up a lot of memory and performance pressure; that eventually adds up to superior scalability and responsiveness of the system.

Referring now to FIG. 1A examples of how this functionality is implemented are illustrated. FIG. 1A illustrates a network connection 110. Messages 112 can be sent on the network connection 110. In the example illustrated, a message 112 can be sent between the database 102 and a client computer system 114. The client system 114 includes memory 116 and a central processing unit 118. The central processing unit 118 may include one or more threads/cores/processors 120-1, 120-2, 120-3, and 120-4. The memory 116 can store data from the database 102 as illustrated. In particular, the example illustrated in FIG. 1A shows that the memory 116 stores data including a ID correlated to a last name field. In particular, the data stored in the ID field 118 may be the ID from column 108-1 for record 106-1. As such, the data stored in the Last Name field 120 may be the data in the record 106-1 in the Last Name column 108-2. It should be noted, that in the present example, a request message 112 is sent to the database 102 which requests only a single field and not an entire record 106. Further, only a single field is returned in a message 112. In this way, memory resources can be optimized at the client computer 114.

In some embodiments, a path may be used to identify the source in the data store of the data. For example, the path may specify the data store name concatenated with the namespace, concatenated with the record set name, concatenated with a record unique key, concatenated with a field (or column).

The system is capable of mapping any arbitrary data source to a well-defined conceptual data model. This conceptual data model is fundamentally comprised of 'Record Sets', 'Records' and 'Fields'. The inter-relationship of these components are one-many in the order of specification. A field is the fundamental data unit that could store multiple versions of data in an atomic manner. A Record could have one or more fields at different times; but not all fields are required to be present at any given time or to perform any given operation. This models Record as a jagged array of fields. A Record Set is a collection of Records that could be homogenous or heterogenous in nature.

This design may impacts almost any data management service. For example, in identity management subsequent retrieval of the same data is rendezvoud on fields instead of records. The queries to retrieve the data are inspected and modified, if necessary, to ensure enough information will be retrieved to be able to identify the fields in the loaded buffer. Similarly for updates, concurrency management is done using the fields that are available at the time of operation, instead of requiring all fields of a record to be present to perform the operation.

Figure 2:
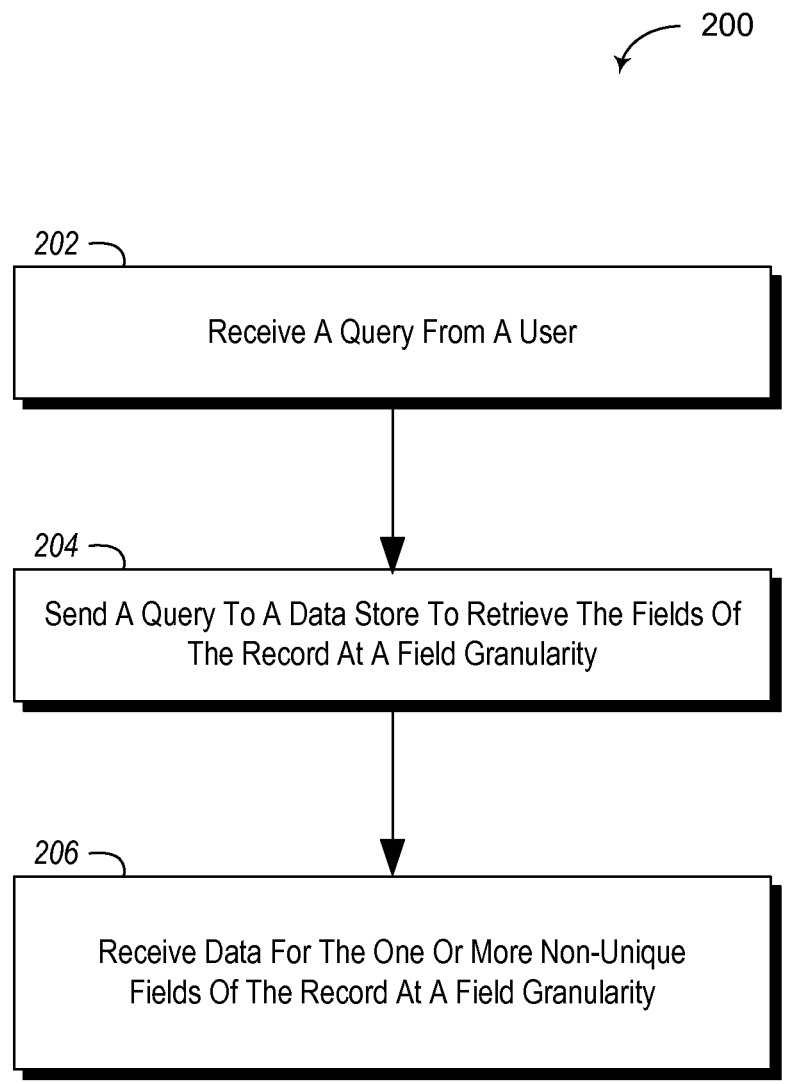
FIG. 2 illustrates a method of querying for data.

Referring now to FIG. 2, a method is illustrated. The method 200 may be practiced in a computing environment, whereby one or more processors perform various acts as a result of executing computer executable instructions stored on a computer readable medium. The method 200 may include acts for accessing data in a data store. The method 200 includes receiving a query from a user (act 202). The query specifying one or more non-unique fields of a record. In particular, the method may be practiced where the fields are specified at a field granularity. As noted above, in some embodiments, specification may be made by specifying a path to a field (or specifically in some embodiments using tables, a cell). The method 200 further includes sending the query to a data store to retrieve the fields of the record at a field granularity (act 204). The method 200 further includes receiving data for the one or more non-unique fields of the record at a field granularity (act 206).

Figure 3:
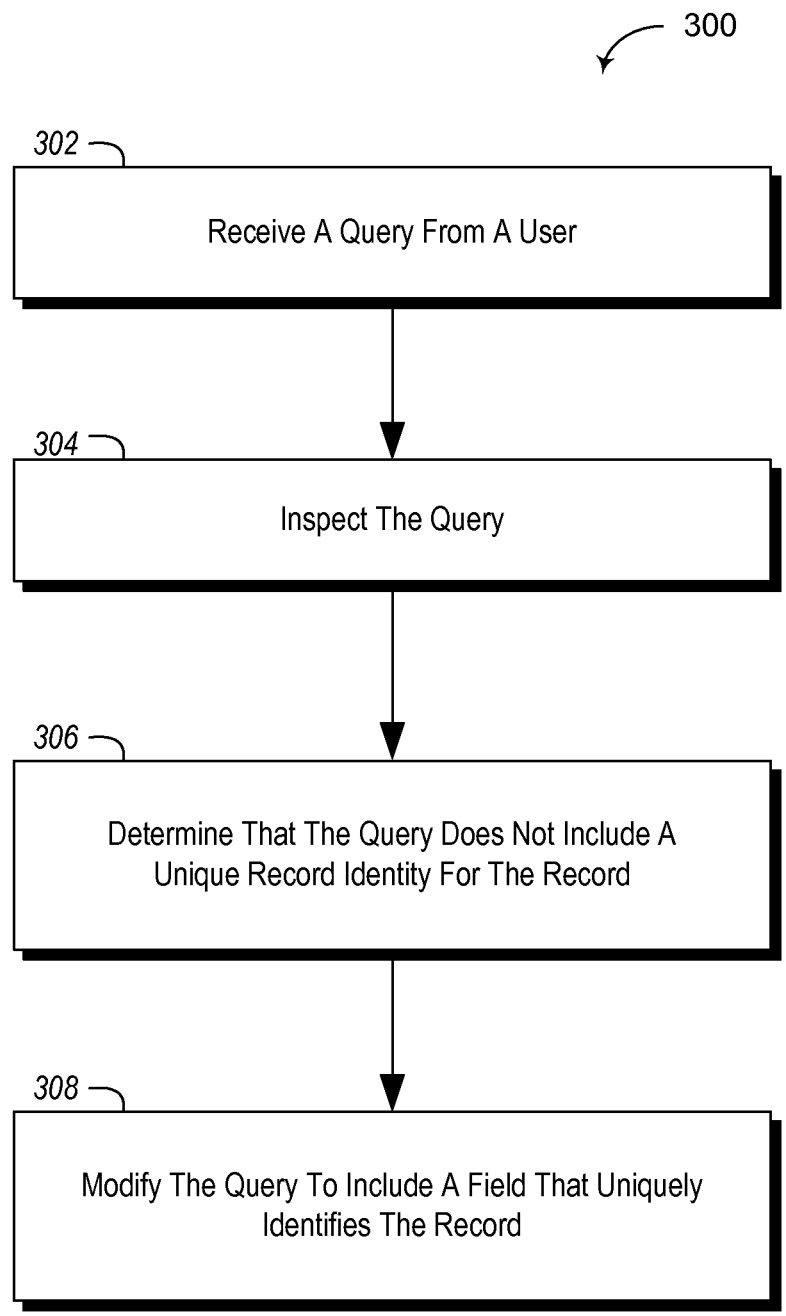
FIG. 3 illustrates a method of querying for data.

Referring now to FIG. 3, a method is illustrated. The method 300 may be practiced in a computing environment, whereby one or more processors perform various acts as a result of executing computer executable instructions stored on a computer readable medium. The method 300 may include acts for accessing data in a data store. The method includes receiving a query from a user (act 302). The query specifies one or more non-unique fields of a record. In particular, the method may be practiced where the fields are specified at a field granularity. As noted above, in some embodiments, specification may be made by specifying a path to a field (or specifically in some embodiments using tables, a cell).

The method 300 further includes inspecting the query (act 304). For example, in one embodiment, the query may be inspected at the client computer 114 to determine if enough information is included in the query to uniquely identify results returned from the query. In particular, while a user may be able to request a single field in the query, a final query that is sent to a database should include a specification of a unique identifier associated with the field, such as the specification of a ID field, so that the data in a single field can be uniquely identified.

The method 300 further includes determining from that inspection, that the query does not include a unique record identity for the record (act 306). As a result of determing, the method 300 further includes modifying the query to include a field, such as a ID field, that uniquely identifies the record (act 308). This modified query can then be sent to a data store, such as the database 102, where the data for the originally requested field(s) can be retrieved along with the unique identifier data.

Figure 4:
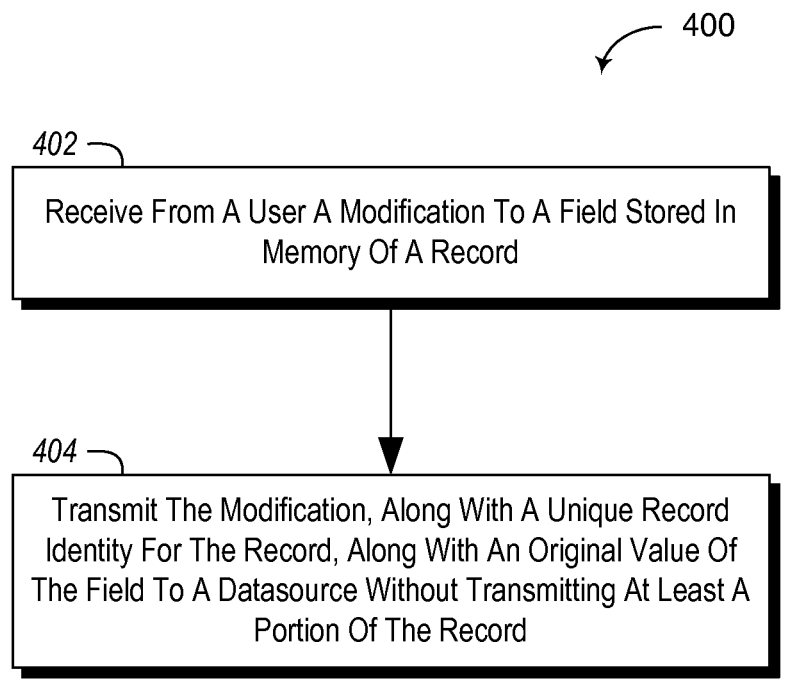
FIG. 4 illustrates a method of writing back data to a data store.

Referring now to FIG. 4 a method 400 is illustrated. The method 400 may be practiced in a computing environment, whereby one or more processors perform various acts as a result of executing computer executable instructions stored on a computer readable medium. The method 400 may include acts for storing data to a data store. The method includes receiving from a user a modification to a field stored in memory of a record (act 402). For example, a user may interact with a field stored in the memory 116 of the client system 114. The method 400 further includes transmitting the modificaiton, along with a unique record identiy for the record, along with an original value of the field to a data store without transmitting at least a portion of the record (act 404). For example, in the example illustrated, information in a ID field and the current version 122 and the original version 124 of the last name field may be sent to the database 102. Other portions of the record to which the ID data and last name data belong may not be sent. In fact, often, the other data may not even exist at the client computer system 114. At the data store the original value is compared with a data store value at the data store without comparing at least some other portion of the record. When the original value is equal to the data store value, then the data store value is changed to the modified value.

As noted, the method 400 may be practiced where the portion of the record that is not transmitted to the data source is not stored in memory with the modification and the original value.

Notably, embodiments may be practiced where only a single field in addition to the unique ID is transmitted to the data store. For example, the 400 may be practice where transmitting includes transmitting the unique ID field of the record along with a single other field of the record without transmitting any other field of the record.

Preservation of Multiple Verstions of Data in a 'Field'

Figure 1B:
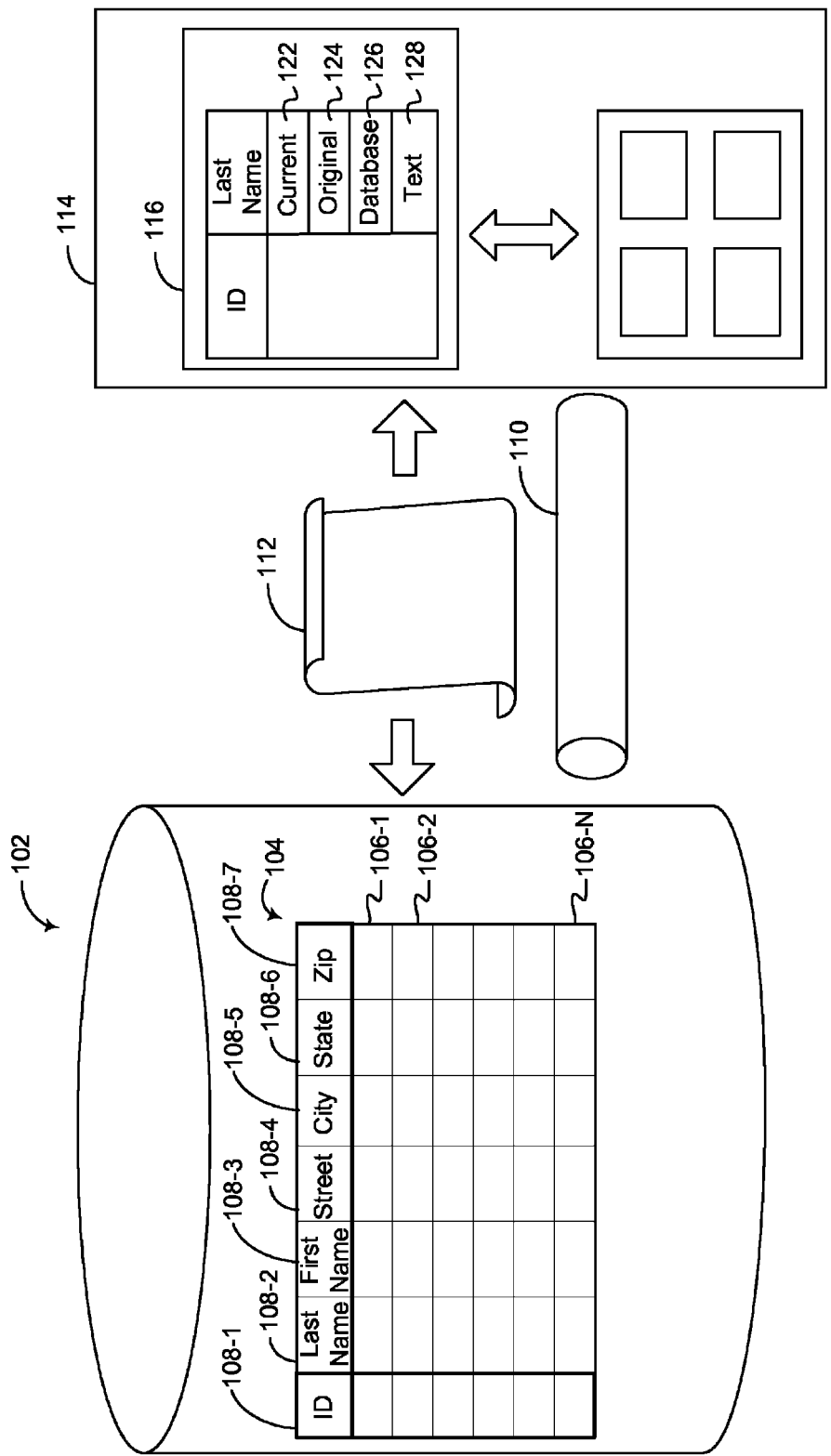
FIG. 1B illustrates a database and client running a specialized framework, illustrating the use of multiple versions of a field.

Examples may be implemented where a given field can hold multiple versions of the data. In FIG. 1B, an example is illustrated where four versions of data are stored, namely 'current' 122, 'original' 124, 'database' 126 and 'text' 128. The original version 124 is a version of data in field obtained from the database 102 and stored in the memory 116. In the example illustrated, the data field is the last name field 108-2 for a record 106 at the database 102. At the client system 114, operations may be performed which result in new values or changes to values of the data for the particular field. These changes are typically stored locally at the client computer system 114 in the current version 122 at the client system 114.

Traditional systems typically keep current and original versions to enable editing and concurrency management. In particular, a system can change data by making entries to the current version 122. The system can then use the original version to determine if the current version can safely be written back to the database 102. For example, when it is desirable to write data back to the database 102, the value in the field in question should be the same as the original value 124. If it is different, then some other agent has made changes to the database, such that the changes made at the client 114 and stored in the current version 122 would be invalid with respect to what is at the database 102. Thus, when writing back, the current version 122 is usually sent with the original version 124 so that a comparison can be made at the data base 102 to determine if the field at the database 102 should be updated with the current version 122.

Embodiments may not only keep those two, but also keep one or more of a 'database' version 126 and/or a 'text' version 128. The 'database' version is a copy of data that is fetched during the last touch of the same field location in the data source. For example, the client 114 may interact with the database 102 at time subsequent to the initial fetching of the original value 124. Those interactions may allow the client 114 to have access to a value of data in a field that is more current than the original value 124. This more current value can be stored as a database value 126. This enables advanced scenarios like marking of data as 'stale' or in 'conflict' as data is processed at runtime.

The 'text' version 128 enables richer editing of the data by relaxing the primitive data type constraints. In particular, the text version 128 either has relaxed constraints or no constraints on the type of data that can be stored. For example, even though a data field may be originally constrained to integer data types, the text version 128 may be allowed to use one of a number of additional data types, such as Boolean types, floating point types, string types, etc. Alternatively, the text version 128 may be allowed to store data of any type. Illustrating an example, a string value 'Foo' could be saved to a field of type Boolean.

Comparing various conditions related to the versions 122, 124, 126 and 128 may provide data state information that can be helpful when performing data operations. The following table illustrates data state for a number of different conditions.

| Condition | State |
| --- | --- |
| Original = Current | Unchanged |
| Original != Current | Modified |
| Original != Database | Stale |
| Type of Text != Type of Current | type coercion error |
| Modified and Stale state | Conflict |

In the table illustrated above, when the original version 124 is equal to the current version 122, the state of the data for the field is unchanged, meaning that the data is unchanged from the value of the data originally retrieved from the database 102. When the original version 124 is not equal to the current version 122, the state of the data is modified, meaning that the data for the field has been modified from the data that was originally retrieved from the database 102. When the original version 124 is not equal to the database version 126, the state of the data is stale, meaning that other agents have interacted with the database 102 to change the data value after the data was originally retrieved from the database 102.

When the type of the text version 128 is not equal, or does not conform to the type of the current version 122, the state of the data is type coercion error. This means that the type in the text version 128 is not compatible with the type of the current version 122. Besides being able to provide information so indicating the type mismatch, embodiments may also include further functionality for dealing with the type mismatch. In particular, embodiments may allow for searching of the text version 128 to find a portion or a conversion that would allow all or portions of the text version 128 to conform to the type of the current version 122. For example, if the type of the current version 122 is integer, and the value of the text version is "five", a conversion could be performed, using a dictionary or other processing device, to convert the value to "5". The text version 128 could then be moved into the current version 122. Alternatively, if the value of the text version 128 is "I would like the value to be 5", processing could be performed to identify the "5" in the string, and the "5" could be moved into the current version 122.

In an alternative embodiment, the metadata associated with the current version 122 as well as the underlying field in the database 102 could be changed. For example, the type of the current version 122 could be changed from integer to string. A similar change in the metadata would be made to the underlying column in the database 102.

Alternatively, when the type of the text version 128 is equal, or conforms to the type of the current version 122, the value of the text version 128 can be moved directly into the current version 122. Embodiments may also include optimizations where the container for the text version 128 is destroyed so as to free up memory space for other uses.

Figure 5:
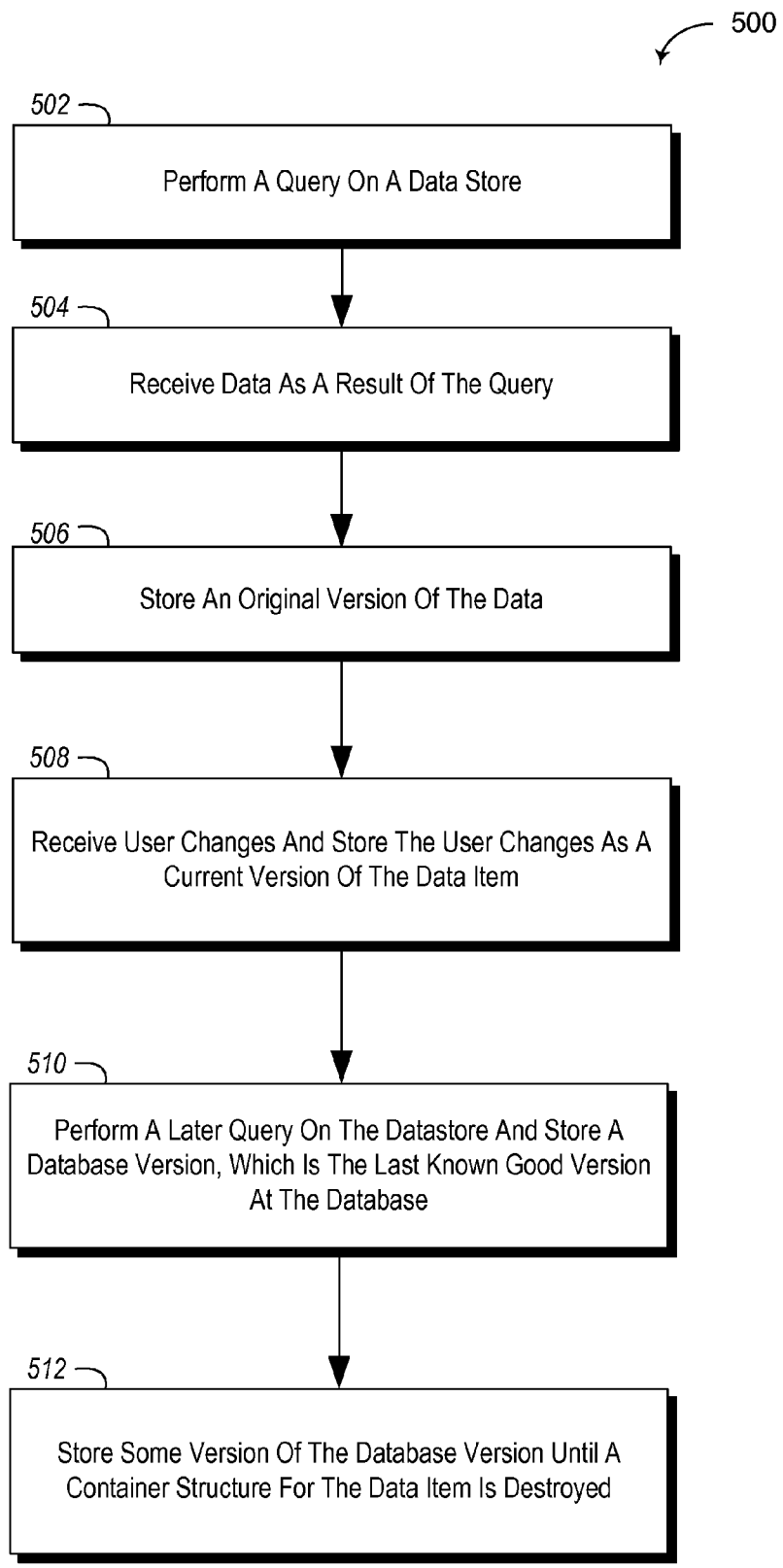
FIG. 5 illustrates a method of storing additional versions of a field.

FIG. 5 illustrates a method 500 that may be practiced in a computing environment, whereby one or more processors perform various acts as a result of executing computer executable instructions stored on a computer readable medium. The method includes acts for preserving multiple versions of a data element. The method includes performing a query on a data store (act 502). For example, the client system 114 may send a query to the database 102. The method 500 further includes receiving data as a result of the query (act 504). For example, the client 114 system may receive a result from the database 102. The method 500 further includes storing an original version of the data (506). FIG. 1B illustrates an example, where an original version is stored. The original version may be the version originally received from a data store such as the database 102. The method 500 further includes receiving user changes and storing the user changes as a current version of the data item (act 508). For example, FIG. 1B illustrates a current version 122. The current version 122 represents a version of a data item stored locally in the memory 116 of the client system 114. The current version may be generated locally at the client system 114. The current version represents user changes to a data item stored in a field.

Figure 1C:
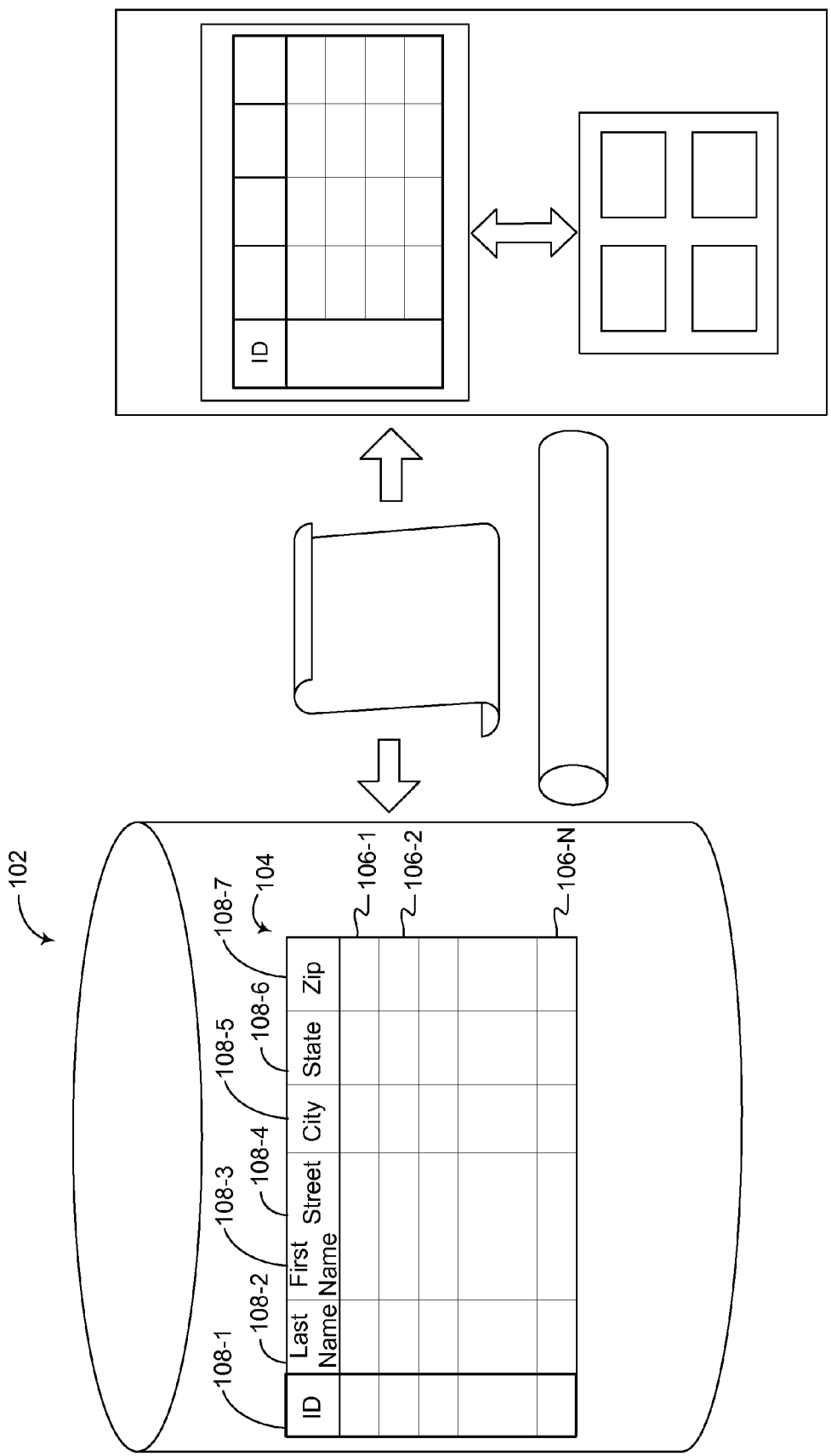
FIG. 1C illustrates a database and client running a specialized framework illustrating the use of multiple versions for multiple fields.

FIG. 1C illustrates that different versions can be maintained for different fields. In particular, one or more of the four versions, Current 122, Original 124, Database 126 and/or Text 128 may be maintained for various fields in a record, up and including all fields in the entire record, if so desired.

The method 500 further includes performing a later query on the data store, and storing a database version which is the last known good version at the data store (act 510). In particular, the database version may be stored at a client computer such as client system 114, which is remote from the data store, such as database 102. Some version of the database version is stored until a container structure for the data item is destroyed (act 512). In particular, a container may be implemented at the client system 114 to store various versions of the data item. The database version is persisted until this container structure is destroyed.

The method 500 may further be practiced to include an act of storing a text version. The text version of the data item may be a version that is un-typed or generically typed and may be non-conformant with the data type of the version from the data store. For example, a version from the data store may be of type integer. However, the text version may be able to hold any type, or may be of type string, which would allow data to be represented as a string, even though such data may be conformant with other types.

In such embodiments, the method 500 may further include determining that text version contains data that would conform to the data type of the version from the data store. As a result, the text version of the data item can be copied directly to the current version of the data item. In some embodiments, the system can then be optimized by not storing a text version once the text version has been copied to the current version.

In an alternative embodiment, a determination may be made determining that the text version contains data that would not conform to the data type of the version from the data store, and as a result, finding a conformant type by examining and modifying the text version find a conformant type by examining text version. For example translating the string "five" to the integer "5".

In another alternative embodiment, a determination may be made determining that the text version contains data that would not conform to the data type of the version from the data store, and as a result, changing the type for the data item by changing the type metadata at the data store. In some embodiments, this may be accomplished using the embodiment described below where metadata is handled in a fashion similar to the underlying data.

Tracking of all Executed Queries Inside the System

Typical systems only store the results and do not track the original queries from a client 114 used to fetch the data from the underlying data source, such as the database 102. To refresh data at the client, a new query is generated to retrieve records for any records stored in an appropriate location in memory 116. This is typically done by using the ID as a key into the database table 104 to retrieve the appropriate records.

Embodiments described herein implement within the framework a facility to keep track of queries. By making use of these tracked queries, scenarios like 'resync' and 'refresh' of data with the underlying data source yields results more conformant to the user's original intent. In particular, the actual queries generated by a user at the client 114 to retrieve data at the database 102 can be re-run to refresh the data in the memory 116 by re-acquiring the data from the database 102 in the same fashion as originally acquired.

Notably, embodiments may include further functionality for filtering stored queries that should be re-run. For example, queries may be rerun based on time. For example, all queries occurring after (or alternatively before) a certain time stamp can be re-run. Alternatively, all queries occurring within a specified time period can be re-run.

Embodiments may also be implemented in conjunction with embodiments that retrieve data at a field granularity. In particular, by refreshing by re-running queries can be used to refresh at a field granularity.

Figure 6:
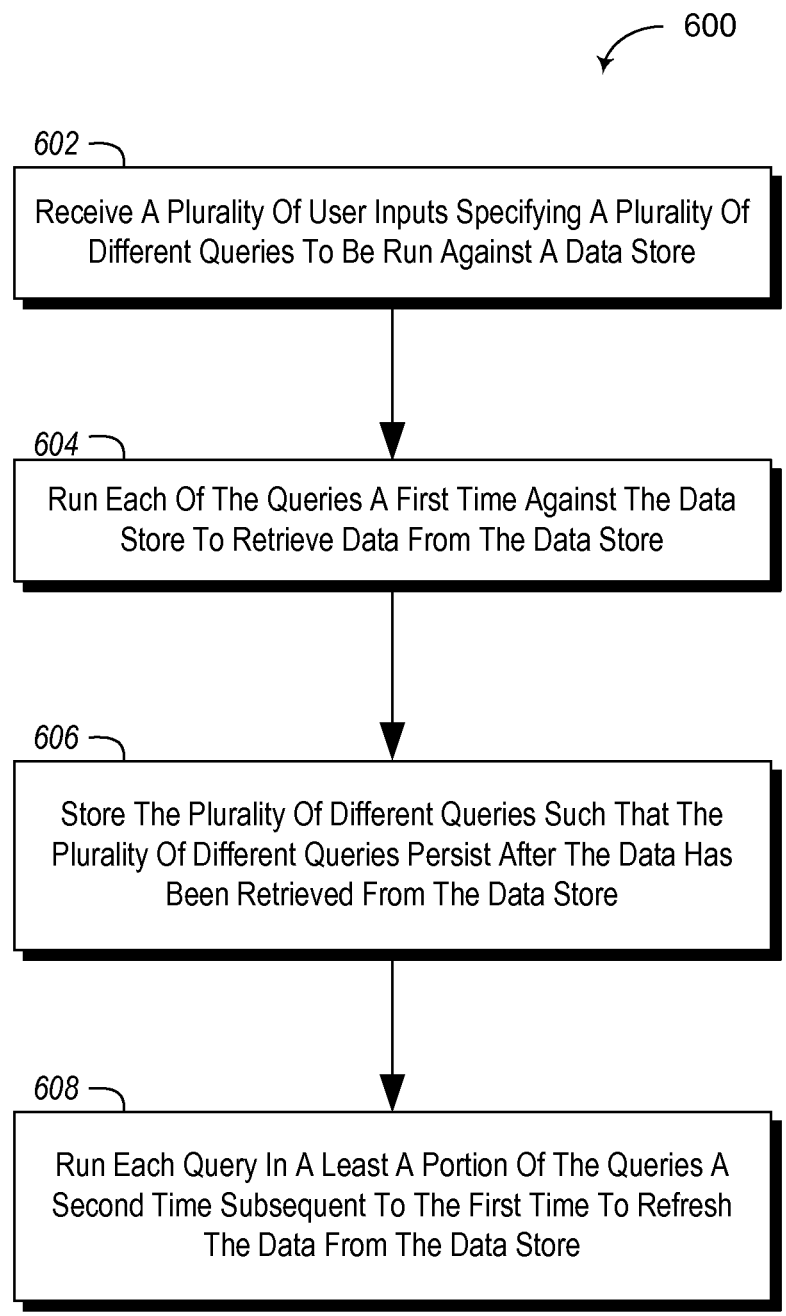
FIG. 6 illustrates a method of refreshing data.

Further, embodiments may be implemented where stored queries can be used when writing data back to the database 102. In particular, queries could be re-run to ensure that the state of the database 102 is the same as when the original queries were run. In particular, with respect to FIG. 1C, database versions 126 can be obtained from the data store 102 as some time subsequent to when original version 124 were obtained from the data store 102 current versions Referring now to FIG. 6, a method 600 is illustrated. The method 600 may be practiced in a computing environment, whereby one or more processors perform various acts as a result of executing computer executable instructions stored on a computer readable medium. The method 600 includes acts for refreshing data operations on data in a data store. The method 600 includes receiving a plurality of user inputs specifying a plurality of different queries to be run against a data store (act 602). For example, queries may be received from a user at the client system 114 over time. Note that a user as used herein is not necessarily a human user, but may be some computer implemented process. The method 600 further includes running each of the queries a first time against the data store to retrieve data from the data store (act 604). As noted, a first time does not necessarily mean that the queries are all run together at a specific time, but rather, the queries may been run when appropriate, such as at a time proximate to when the received. The method 600 further includes storing the plurality of different queries such that the plurality of different queries persist after the data has been retrieved from the data store (act 606). For example, the queries may be stored and/or archived at the client system 114. The method 600 further includes running each query in at least a portion of the queries a second time subsequent to the first time to refresh the data from the data store (act 608). For example, all or a portion of the queries may be rerun as part of a data refresh operation to refresh data by obtaining fresh copies from the data store.

Embodiments of the method 600 may be implemented to further include filtering the queries to obtain the portion of the queries, before the queries are run a second time. For example, filtering may include filtering based on a time when a query was first run.

The method 600 may include comparing data retrieved from running the queries a first time to data retrieved from running the queries in the at least a portion of the queries a second time, and based on data retrieved from running the queries a first time matching data retrieved from running the queries in the at least a portion of the queries a second time, writing changed versions of the data back to the data store. In this way, concurrency decisions to write back data can be based on reevaluating the queries in addition to comparing original data in hand.

Presentation and Treatment of Metadata as Data

Embodiments may be implemented whereby metadata can be presented in the same data model as data. This makes it a very simple and consistent experience for client applications to process and manipulate metadata because much of the investments made to manage data can be reused as-is. Metadata may be, for example, the data specifying the type of data entered into a column 108 in the database 102. For example, a column may specify that integers should be entered into the column. This metadata specifying the type can be converted to a format that is able to be queried in the same fashion as data values entered into the cells of the table 104 themselves. Thus, a client can obtain metadata for the database by re-using the same query mechanisms as for the underlying data.

Embodiments may be implemented which allow the metadata to be manipulated like the underlying data as well. For example, using existing write-back functionality, metadata can be changed or added. For example, the type of a column 108 can be changed by using a simple write-back procedure. Alternatively or additionally, new columns can be added or changed using write-back procedures from the client 114 to the database 102.

Fault-In Metadata as Needed

Embodiments may be implemented where no initial environment setup with respect to metadata is required for the system to be fully initialized and operational. In particular, a framework instance at the client 114 may start and be fully functional without receiving a schema for the database 102. Rather, a client system 114 faults-in metadata as needed. Traditional data frameworks require some sort of awareness to the environment setup before the system become operational. However, some embodiments may lower the entry bar by not requiring any sort of environment setup to bootstrap. This is done by analyzing query expressions and faulting-in only enough metadata required to process the results of the query. This also adds up to better performance and scalability of the system inasmuch as only the relevant pieces of environment are ever brought in to memory.

Illustrating now an example, a framework at the client 114 may receive a query from an agent at the client 114. The framework can analyze the query to determine what metadata is needed. For example, if a query is made against a particular column, the framework can query the database 102 to obtain metadata about the name of the column, the data type of the column, uniqueness characteristics of the column (e.g. "is the column a primary key").

Figure 7:
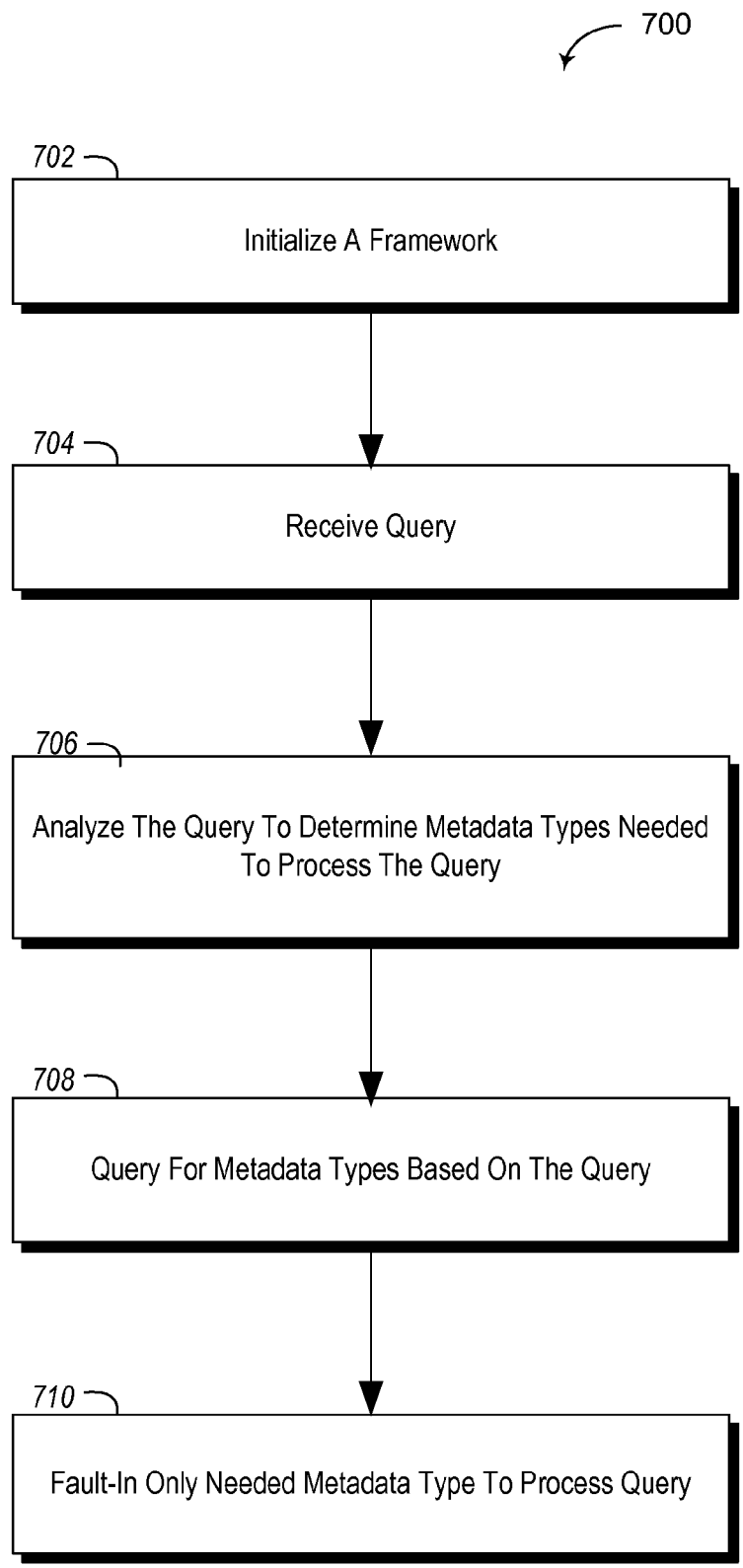
FIG. 7 illustrates a method of initializing a framework.

Referring now to FIG. 7, a method 600 is illustrated. The method 700 may be practiced in a computing environment whereby one or more processors perform various acts as a result of executing computer executable instructions stored on a computer readable medium. The method 700 includes initializing a framework (act 702). Initialization is done such that the framework is operational without receiving a schema for the data store. The method 700 further includes receiving a query, such as by a user entering a query at a client for querying a data store (act 704). The method 700 further includes analyzing the query to determine metadata types needed to process the query and store results from query (act 706). The method 600 further includes querying for metadata types based on the query (act 708). For example, a framework at a client system can query a data store based on the original query for data received at the data store (e.g. at act 704). This query can be used to determine what metadata needs to be initialized at the framework at the client system before the original query can be serviced. . The method 700 further includes faulting-in only needed metadata types to process the original query (act 710).

Facility to Take Data Offline and Merge Back Smartly to the Live Data Source

Embodiments may support a notion of local offline storage that is used to increase robustness of the system in case of any unforeseen failure in the system. In some embodiments functionality may be included to pull the data and disconnect from the source until the data is locally processed and ready to be merged back. Given the allowance of multiple version of the data in a 'field', this system offers variety of options to the system clients on how to merge the data back to a potentially live data source in case of conflicts.

Asynchronous Programming and Execution Model

While the concept of asynchronous programming and execution is not new in computer science, typical data frameworks offers very limited support of asynchronous operations only on certain operations. This system supports asynchronous operations on all operations and services. This tremendously increases the performance and scalability of the system.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a computer-implemented method of updating data at a data store in response to receiving update data from a client system, the method comprising:

the client system that includes at least one processor, receiving a modified value for a particular field that is stored in memory at the client system, the modified value comprising a modification of an existing value of the particular field, the particular field corresponding to a record stored at a data store with a plurality of fields including the particular field having a data store value; and the client system transmitting the modified value for the particular filed, along with a unique record identity value corresponding to a record identity field for the record, along with an original value of the particular field to the data store and without transmitting at least some value data corresponding to at least one other field associated with the record;

wherein, at the data store, the original value received from the client system is compared with the data store value that is currently stored in the record at the data store, the unique record identity value received from the client system being used to identify the record, and wherein, when it is determined that the received original value is equal to the data store value for the record, then the data store value which is stored by the data store is automatically changed to the modified value corresponding to the modification that was made at the client system.

2. The method of claim 1, wherein the portion of the record that is not transmitted to the data store is not stored in memory with the modification and the original value.

3. The method of claim 1, wherein the method further includes refraining from storing the portion of the record that is not transmitted to the data store in memory along with the modification and the original value.

4. A computer hardware storage device having stored computer-executable instructions which, when executed by a computing system that includes a client system, implement a method of updating data at a data store in response to receiving update data from the client system, wherein the method includes:
  the client system receiving a modified value for a particular field that is stored in memory at the client system, the modified value comprising a modification of an existing value of the particular field, the particular field corresponding to a record stored at a data store with a plurality of fields including the particular field having a data store value; and
  the client system transmitting the modified value for the particular filed, along with a unique record identity value corresponding to a record identity field for the record, along with an original value of the particular field to the data store and without transmitting at least some value data corresponding to at least one other field associated with the record;
    wherein, at the data store, the original value received from the client system is compared with the data store value that is currently stored in the record at the data store, the unique record identity value received from the client system being used to identify the record, and
    wherein, when it is determined that the recieved original value is equal to the data store value for the record, then the data store value which is stored by the data store is automatically changed to the modified value corresponding to the modification that was made at the client system.

5. The computer hardware storage device of claim 4, wherein the portion of the record that is not transmitted to the data store is not stored in memory with the modification and the original value.

6. The computer hardware storage device of claim 4, wherein the method further includes refraining from storing the portion of the record that is not transmitted to the data store in memory along with the modification and the original value.

7. The computer hardware storage device of claim 4, wherein the computer storage device comprises the computing system and includes at least one processor.

8. A computer hardware storage device having stored computer-executable instructions which, when executed by a computing system, implement a method of updating data at a data store, wherein the method includes:
  the data store receiving from a client system a modification to a particular field that is stored in a record at a data store, the record including a plurality of fields including the particular field, the modification comprising a modified value, the modification being received along with a unique record identity for the record, along with an original value of the field to the data store and which is received without at least one other portion of the record;
  comparing the recieved original value with a data store value at the particular field of the data store, the unique record identity being used to identify the record;
  determining that the original value is equal to the data store value; and
  automatically changing the data store value at the data store to the modified value at the data store in response to determining that the original value received from the client system is equal to the stored data store value.

9. The computer hardware storage device of claim 8, wherein the at least one other portion comprises a field of the record.

10. The computer hardware storage device of claim 8, wherein the computer storage device comprises the computing system and includes at least one processor.

11. The method of claim 1, wherein the client system stores a plurality of different values in the particular field, including the modified value and the original value.

12. The method of claim 11, wherein the client system stores a database value in the particular field, the database field comprising a last touch value of the data store value.

13. The method of claim 11, wherein the client system stores a text value corresponding to the original value, along with the original value within the particular field, and which is stored with fewer constraints than the original value.

14. The computer hardware storage device of claim 4, wherein the client system stores a plurality of different values in the particular field, including the modified value and the original value.

15. The computer hardware storage device of claim 14, wherein the client system stores a database value in the particular field, the database field comprising a last touch value of the data store value.

16. The method of claim 14, wherein the client system stores a text value corresponding to the original value, along with the original value within the particular field, and which is stored with fewer constraints than the original value.

* * * * *